(12) United States Patent
Christman (10) Patent No.: US 10,442,551 B2
(45) Date of Patent: Oct. 15, 2019

(54) FUSE PIN MODEL DIFFERENTIAL OR EXCLUSION FEATURE

(71) Applicant: The Boeing Company, Chicago, IL (US)

(72) Inventor: David B. Christman, Ravensdale, WA (US)

(73) Assignee: THE BOEING COMPANY, Chicago, IL (US)

( * ) Notice: Subject to any disclaimer, the term of this patent is extended or adjusted under 35 U.S.C. 154(b) by 117 days.

(21) Appl. No.: 14/942,422

(22) Filed: Nov. 16, 2015

(65) Prior Publication Data

US 2017/0137147 A1    May 18, 2017

(51) Int. Cl.
*B64D 47/00* (2006.01)
*F16B 19/00* (2006.01)

(52) U.S. Cl.
CPC .............. *B64D 47/00* (2013.01); *F16B 19/00* (2013.01)

(58) Field of Classification Search
CPC ................................. B64D 47/00; F16B 13/00
See application file for complete search history.

(56) References Cited

U.S. PATENT DOCUMENTS

| | | | | |
|---|---|---|---|---|
| 2,468,669 A | * | 4/1949 | Holmes ................. | B60D 1/155 180/14.1 |
| 3,982,408 A | * | 9/1976 | Wright .................... | F16D 3/185 464/154 |
| 4,087,062 A | * | 5/1978 | Masclet ................. | B64C 25/00 114/279 |
| 4,248,105 A | * | 2/1981 | Downing ................ | B64C 13/34 244/213 |
| 4,273,006 A | * | 6/1981 | Woodbury ............. | B64C 13/28 244/213 |
| 4,392,622 A | * | 7/1983 | McClaflin .............. | B64C 25/10 244/102 A |

(Continued)

FOREIGN PATENT DOCUMENTS

GB             779294         7/1957

OTHER PUBLICATIONS

European Patent Office; Extended European Search Report; European Patent Application No. 16198657.5; dated Mar. 17, 2017.

(Continued)

*Primary Examiner* — Michael H Wang
(74) *Attorney, Agent, or Firm* — Parsons Behle & Latimer (57) ABSTRACT

A fastening system having differentiable components includes a first fuse pin with a first mating figure and being configured to shear upon the application of a first predetermined load and a first receiver with a second mating feature. The first and second mating features correspond and permit the insertion of the first fuse pin into the first receiver to selectively connect components. The system may include a second fuse pin having a third mating feature and being configured to shear upon the application of a second predetermined load, which may differ from the first predetermined load. The second fuse pin having a third mating feature that prevents the insertion of the second fuse pin into the first receiver. The first fuse pin may be configured to connect together components of a first aircraft and the second fuse pin may be configured to connect together components of a different aircraft.

15 Claims, 5 Drawing Sheets

(56) References Cited

U.S. PATENT DOCUMENTS

| | | | | |
|---|---|---|---|---|
| 4,392,623 A * | 7/1983 | Munsen | ............... | B64C 25/10 |
| | | | | 244/102 R |
| 4,815,678 A * | 3/1989 | Gawne | ................. | B64C 25/00 |
| | | | | 244/100 R |
| 6,007,267 A * | 12/1999 | VanHorn | ............... | B66C 15/00 |
| | | | | 403/2 |
| 6,679,452 B1 * | 1/2004 | Cottet | ................ | B64C 1/0009 |
| | | | | 244/102 R |
| 7,775,093 B2 * | 8/2010 | Cooper | ............ | G01M 5/0041 |
| | | | | 403/2 |
| 8,800,382 B2 * | 8/2014 | Bennett | ............... | B64C 25/00 |
| | | | | 73/802 |
| 2004/0237749 A1 | 12/2004 | Green | | |
| 2010/0284764 A1 | 11/2010 | Chen | | |
| 2014/0042268 A1 * | 2/2014 | Sandy | ............... | B64D 27/26 |
| | | | | 244/54 |

OTHER PUBLICATIONS

European Patent Office; European Search Report; European Patent Application No. 16 198 657.5; dated Jan. 8, 2018.
European Patent Office; Extended European Search Report; European Patent Application No. 19150804.3; dated Mar. 8, 2019.

* cited by examiner

FUSE PIN MODEL DIFFERENTIAL OR EXCLUSION FEATURE

BACKGROUND

Field of the Disclosure

The embodiments described herein relate to systems and methods for a fastening system having differentiable components that prevent the use of the incorrect fastening components to secure together two or more parts.

Description of the Related Art

A fastening system may be used to selectively connect together two or more components or parts. The system may include a fuse pin and a receiver that where inserted together selectively connect together two or more components. The fuse pin may be configured to shear upon the application of a predetermined force in an effort to prevent damage to other components of a system. For example, a fuse pin configured to shear upon the application of a predetermined force may connect a gear beam to a dog house mounted to a spur of an aircraft. If the aircraft has a particularly hard landing or the landing gear impacts an object, the fuse pin is configured to shear if the load is at or above a predetermined amount. The shearing of the fuse pin may prevent other components from being damaged due to the hard landing and/or impact. For example, the shearing of the fuse pin may help to prevent damage to the fuel box on the wing of the aircraft.

The use of fuse pins to connect aircraft components is known. However, a first model of an aircraft may use a first fuse pin configured to shear at a first predetermined load and a second model of an aircraft may use a second fuse pin configured to shear at a second predetermined load, which differs from the first predetermined load. Although the first and second fuse pins are configured to shear on different loads, the visual appearance may be similar, which potentially could lead to the installation of the wrong fuse pin in an aircraft. Alternatively, the wrong fuse pin could be installed into an aircraft by mistake even if the fuse pins differ in appearance. The installation of the wrong fuse pin into an aircraft system may be problematic as would be appreciated by one of ordinary skill in the art. For example, a wrong fuse pin may shear at a lower load than intended or may not shear when intended. Thus, it would be beneficial to prevent the insertion of the wrong fuse pin into the receiver of a fastener system.

SUMMARY

The present disclosure is directed to a method and system that address at least some of the problems and disadvantages discussed above.

One embodiment is a fastening system having differentiable components comprising a first fuse pin configured to shear upon the application of a first predetermined load, the first fuse pin having a first mating feature. The system comprises a first receiver configured to receive the first fuse pin, the first receiver having a second mating feature, wherein the second mating feature corresponds to the first mating feature to permit the insertion of the first fuse pin into the first receiver to selectively connect a first component to a second component. The first and second components may be parts of an aircraft. The first component may comprise a dog house assembly and the second component may comprise a gear beam. The insertion of the first fuse pin into the first receiver may align a plurality of apertures in the first fuse pin with a plurality of apertures in the first receiver.

The system may comprise a plurality of fasteners inserted through the apertures of the first fuse pin and the first receiver to selectively connect the first fuse pin to the first receiver. The system may include a second fuse pin configured to shear upon the application of a second predetermined load, the second fuse pin having a third mating feature, wherein the third mating feature and the second mating feature may prevent the insertion of the second fuse pin into the first receiver to selectively connect the first component to the second component. The second predetermined load may differ from the first predetermined load. The first fuse pin may be configured to selectively connect together components of a first aircraft and the second fuse pin may be configured to selective connect together components of a second aircraft, the second aircraft and the first aircraft not being identical. The first mating feature may be the shape of a head of the first fuse pin, a tab, a groove, a slot, a projection, a ridge, a valley, or an outer diameter. The third mating feature may be the shape of a head of the second fuse pin, a tab, a groove, a slot, a projection, a ridge, a valley, or an outer diameter and wherein the third mating feature prevents the insertion of the second fuse pin into the first receiver to selectively connect the first component to the second component. The second mating feature may be a mirror image of the first mating feature.

Another embodiment of the present disclosure is a method of providing a fastening system having differentiable components. The method comprises providing a first fuse pin, the first fuse pin configured to shear upon the application of a first predetermined load and providing a first receiver configured to receive the first fuse pin. The method comprises varying a feature on the first fuse pin with respect to the same feature on a second fuse pin and varying a feature of the first receiver to correspond with the feature varied on the first fuse pin, wherein the first fuse pin may be inserted into the first receiver.

The method may comprise inserting the first fuse pin into the first receiver to selectively connect together a first component and a second component. The first and second components may be parts of an aircraft. The insertion of the first fuse pin into the first receiver may align a plurality of apertures of the first fuse pin with a plurality of apertures of the first receiver and further comprising inserting a plurality of fasteners through the plurality of apertures to selectively connect the first fuse pin to the first receiver. The method may include providing the second fuse pin, the second fuse pin configured to shear upon the application of a second predetermined load, the second predetermined load differing from the first predetermined load and varying a feature on the second fuse pin, wherein the varied feature prevents the insertion of the second fuse pin into the first receiver to selectively connect together a first component and a second component.

Varying the feature of the first fuse pin may comprise providing a tab and varying the feature of the first receiver may comprise providing a groove, wherein the tab of the first fuse pin fits within the groove of the first receiver when the first fuse pin is inserted into the first receiver. Varying the feature of the first fuse pin may comprise varying a slope of a portion of the first fuse pin with respect to a slope of the corresponding portion of the second fuse pin and varying the feature of the first receiver may comprise varying a slope of a portion of the first receiver to mate with the slope of the varied portion of the first fuse pin. The slope of the corresponding portion of the second fuse pin may prevent the insertion of the second fuse pin into the first receiver.

Another embodiment is a fastening system having differential components. The system comprises a first fuse pin, the first fuse pin having a first mating feature and a first receiver configured to receive the first fuse pin, the first receiver having a second mating feature. The system comprises a second fuse pin, the second fuse pin having a third mating feature, wherein the second mating feature corresponds to the first mating feature to permit the insertion of the first fuse pin into the first receiver to selectively connect a first component to a second component, and wherein the third mating feature in combination with the second mating feature prevents the insertion of the second fuse pin into the first receiver to selectively connect the first component to the second component.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
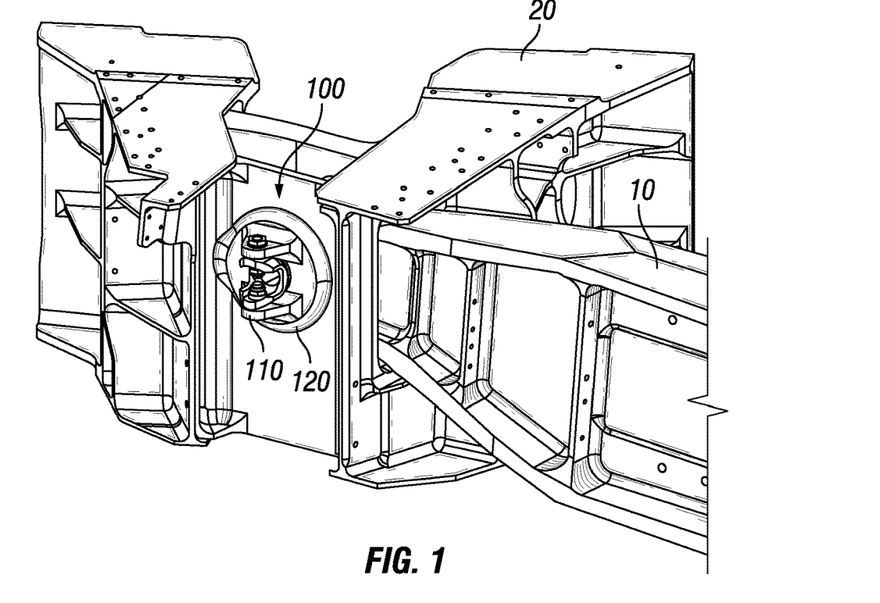
FIG. 1 shows an embodiment of a fastening system selectively connecting together two components.

FIG. 1 shows one embodiment of a fastening system 100 that is selectively connecting a first component 10 to a second component 20. The first and second components 10 and 20 may be parts of an aircraft. For example, the first component 10 may be a gear beam and the second component 20 may be a dog house, which may be a three piece cantilever assembly. A first fuse pin 110 is inserted into a receiver 120 of the second component 20 to the first component 10. The fuse pin 110 may be configured to shear upon the application of a predetermined load or force disconnecting the first component 10 from the second component 20. For example, the fuse pin 110 may be configured to shear upon the application of a first load when an aircraft has a hard landing that exerts a force on the landing gear that exceeds first predetermined amount, which will cause the fuse pin 110 to shear. The fuse pin 110 may be configured to shear to prevent damage to other components of the aircraft due to a hard landing and/or an impact with an object.

Figure 2:
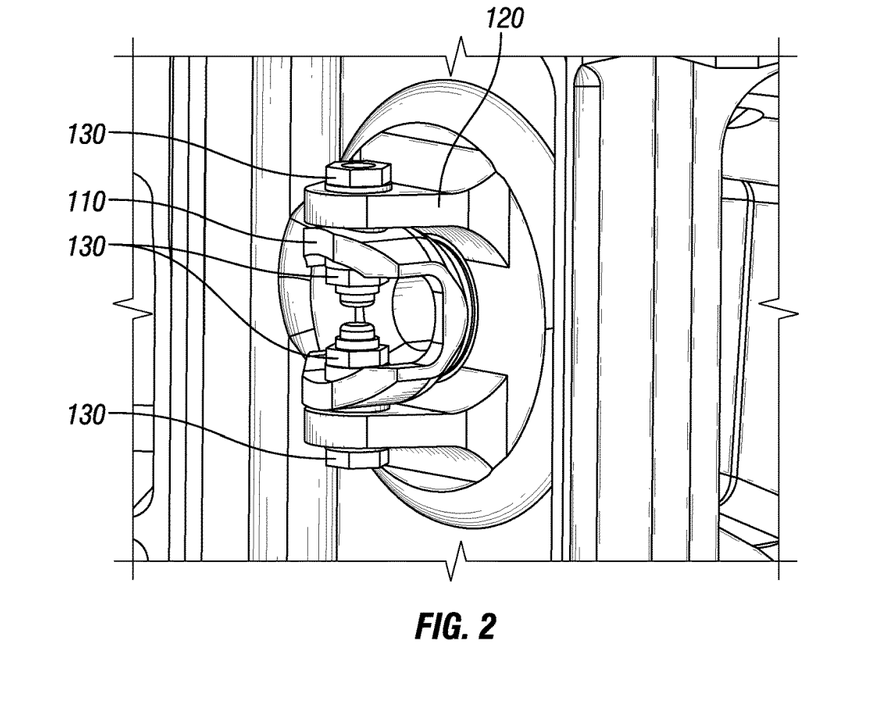
FIG. 2 is a close-up view of the fuse pin and receiver of the fastening system of FIG.

FIG. 2 shows a close-up view of the fuse pin 110 inserted into the receiver 120. Fasteners 130 may be inserted through apertures (best shown in FIG. 3 and FIG. 4) in the fuse pin 110 and receiver 120 to connect the fuse pin 110 to the receiver 120. The shape and configuration of the fuse pin 110 and receiver 120 is for illustrative purposes only and may be varied as would be appreciated by one of ordinary skill in the art having the benefit of this disclosure. The fastening system 100 includes a fuse pin 110 having a first mating feature and a receiver 120 having a second mating feature. The first and second mating features correspond to permit the insertion of the fuse pin 110 into the receiver 120 to selectively connect the first and second components 10 and 20 together as discussed herein. The second mating feature however prevents the inadvertent insertion of a second fuse pin into the receiver 120 in place of the first fuse pin as discussed herein. The first and second mating features may be varied to permit the insertion of the first fuse pin 110, but prevent the insertion of a second fuse pin. For example, the first and second mating features may be, but are not limited to, the shape of a head of the first fuse pin, a tab, a groove, a slot, a projection, a ridge, a valley, or an outer diameter. The second fuse pin may have a third mating feature that differs from the first mating feature of the first fuse pin and thus, does not correspond to the second mating feature of the receiver. Thus, the third mating feature prevents the insertion of the second fuse pin into the receiver 120.

Figure 3:
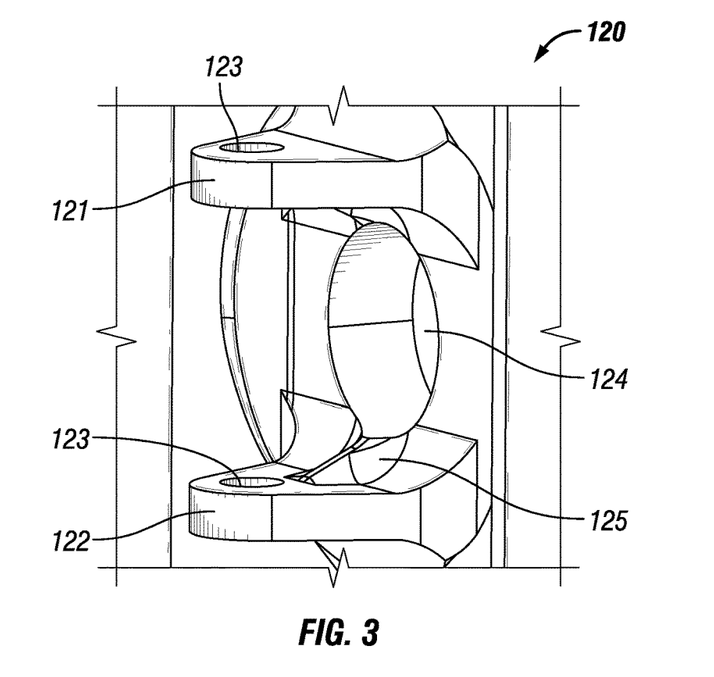
FIG. 3 is a close up view of an embodiment of a receiver of a fastening system.

FIG. 3 shows an embodiment of a receiver 120 that includes a first flange 121 and a second flange 122. The first and second flanges 121 and 122 each include an aperture 123 that permits the insertion of a fastener 130 (shown in FIG. 2) to connect the receiver 120 to a first fuse pin 110. The receiver 120 includes an opening 124 for the insertion of the projection 114 (shown in FIG. 4) of the fuse pin 110. The receiver 120 includes a second mating feature 125 that permits the insertion of a first fuse pin 110, but prevents the insertion of the second fuse pin. The second mating feature may be a tab 125 as shown in FIG. 3. The tab 125 of the receiver 120 may mate with a first mating feature 115, which may be a slot or groove (shown in FIG. 4) on the head of the first fuse pin 110. The tab 125 may prevent the insertion into the receiver 120 of a fuse pin that does not include a corresponding groove or slot as would be appreciated by one of ordinary skill in the art having the benefit of this disclosure. Alternatively, the second mating feature may be a shoulder having a specific slope, a valley, a groove, or other feature that corresponds to the first mating feature of a specific fuse pin 110.

Figure 4:
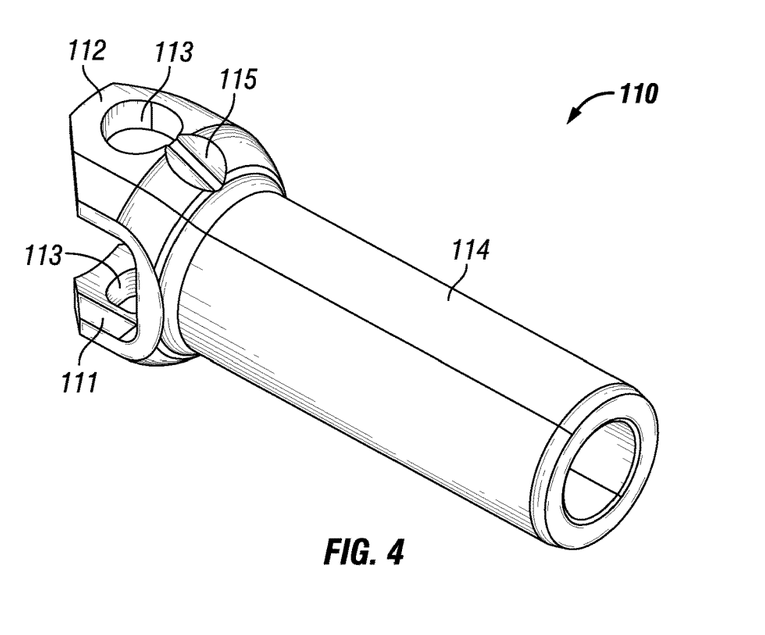
FIG. 4 shows an embodiment of a fuse pin of a fastening system.

FIG. 4 shows an embodiment of a fuse pin 110. The fuse pin 110 includes a first flange 111 and a second flange 112 each including an aperture 113 that permits the insertion of a fastener 130 (shown in FIG. 2) to selectively connected the fuse pin 110 to a specified receiver 120. As discussed herein, the fuse pin 110 may be designed to shear upon the application of a predetermined load when connected to the receiver 120. The fuse pin 110 includes a projection 114 that is inserted through the receiver 120. The fuse pin 110 includes a first mating feature 115, which may be a groove as shown in FIG. 4, that corresponds to a second mating feature on the receiver 120 into which the fuse pin 110 is intended to be inserted. The first mating feature may be the diameter of the head of the fuse pin, a shoulder having a specific slope, a valley, a groove, or other feature that corresponds to the second mating feature of a specific receiver 120 as would be appreciated by one of ordinary skill having the benefit of this disclosure.

Figure 5:
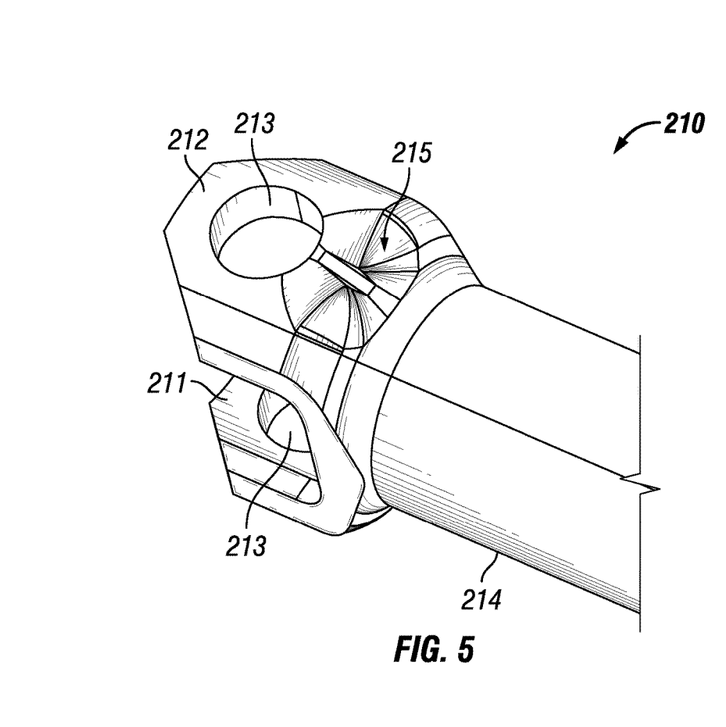
FIG. 5 is a partial view of an embodiment of a fuse pin of a fastening system.

FIG. 5 shows a partial view of an embodiment of a fuse pin 210. The fuse pin 210 includes first and second flanges 211 and 212 having fastener apertures 213 with a projection 214 for the insertion of the fuse pin 210 into a receiver. The fuse pin 210 includes a first mating feature 215, which for illustrative purposes differs from the first mating feature shown in FIG. 4.

Figure 6:
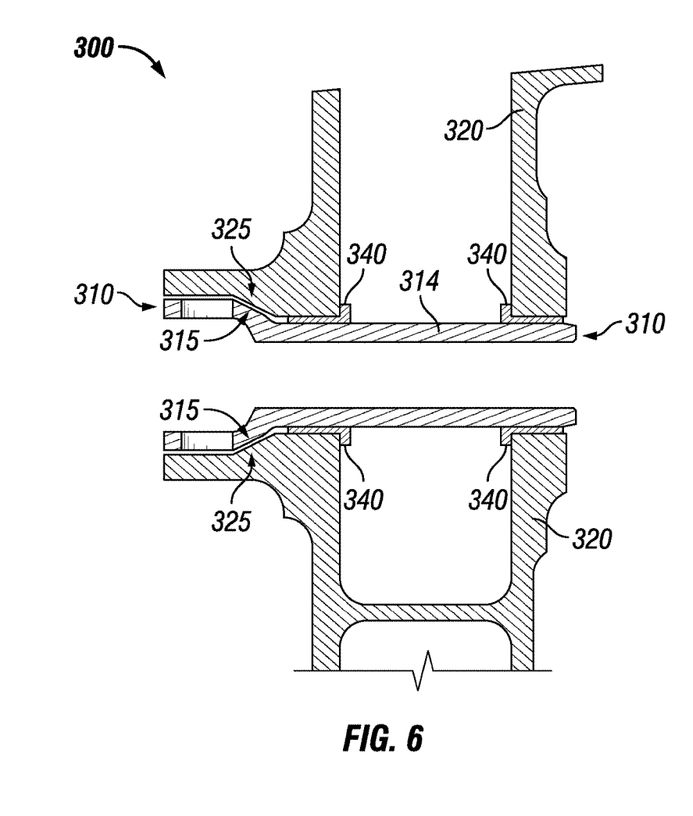
FIG. 6 is a schematic of a fastening system showing a fuse pin positioned within a receiver.

FIG. 6 shows a schematic of a fastener system 300 having differentiable components. The schematic shows a fuse pin 310 inserted into a receiver 320. The system 300 may include bushings 340 positioned between the fuse pin 310 and the receiver 320. The first mating feature 315 of the fuse pin 310 corresponds to the second mating feature 325 of the receiver 320 permitting the insertion of the projection 314 of the fuse pin 310 into the receiver 320. The shape of the first mating feature 315 mirrors the shape of the second mating feature 325 which permits the complete insertion of the fuse pin 310 into the receiver 320.

Figure 7:
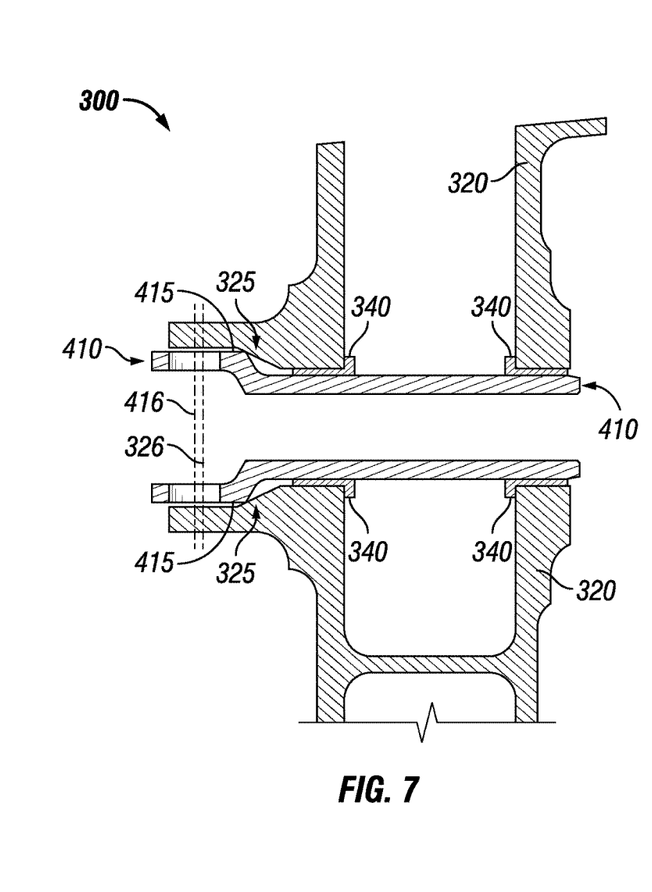
FIG. 7 is a schematic of a fastening system showing the mating features preventing the insertion of a fuse pin within a receiver.

FIG. 7 shows the fastening system 300 with a second fuse pin 410 inserted in the receiver 320. The second fuse pin 410 is not configured to be used with the receiver 320 of the fastening system 300. The shoulder or third mating feature 415 of the second fuse pin 410 prevents the complete insertion of the second fuse pin 410 into the receiver 320. Although the fuse pin 410 is partially inserted into the receiver 320, the mating features 325 and 415 do not correspond and thus, the centerline 416 of the fastener aperture of the second fuse pin 410 does not align with the centerline 326 of the receiver preventing the insertion of fasteners 130 (shown in FIG. 2) to secure the second fuse pin 410 to the receiver 320. Thus, the mating features 325 and 415 prevents the insertion of the second fuse pin 410 with the wrong receiver 320 as discussed herein. The first and second mating features may be varied to permit the insertion of the first fuse pin 11-, but prevent the insertion of a second fuse pin as discussed herein.

Figure 8:
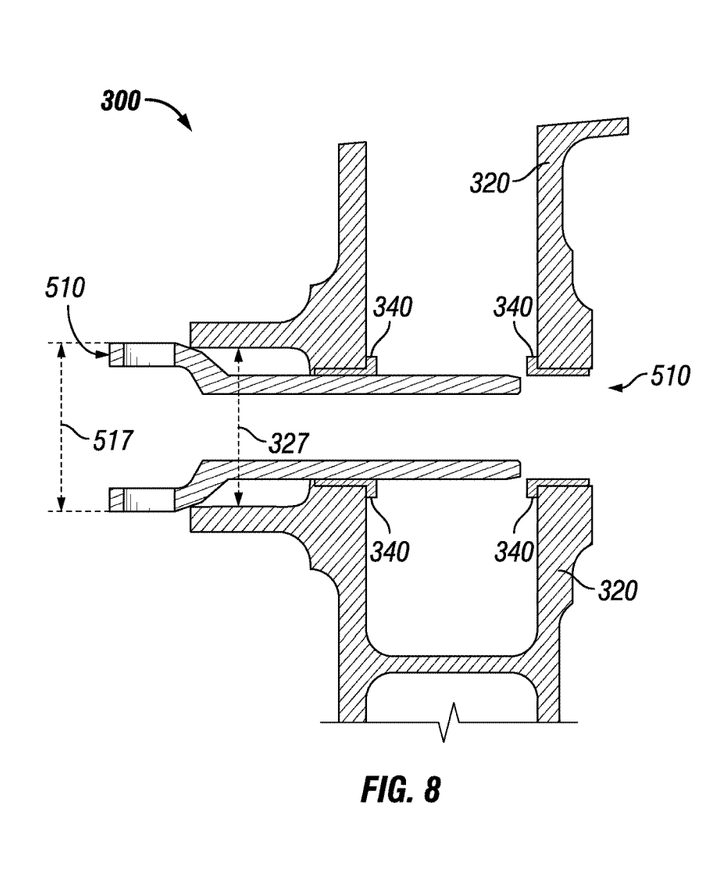
FIG. 8 is a schematic of a fastening system showing the mating features preventing the insertion of a fuse pin within a receiver.

FIG. 8 shows the fastening system 300 with a third fuse pin 510 partially inserted in the receiver 320. The second fuse pin 510 is not configured to be used with the receiver 320 of the fastening system 300. The schematic shows the third fuse pin 510 partially inserted into the receiver 320 for illustrative purposes only. As shown in the schematic, the outer diameter 517 of the head of the third fuse pin 510 is larger than the inner diameter 327 of the receiver 320. Thus, the mating feature (e.g. the outer diameter) of the third fuse pin 510 would prevent or at least decrease the likelihood of the insertion of the third fuse pin 510 into the wrong receiver 320. The fastening system 300 may include multiple fuse pins that are configured to shear at a predetermined load that differs from the first fuse pin 410 configured to be inserted in the receiver 320. As would be appreciated by one of ordinary skill in the art having the benefit of this disclosure, the multiple fuse pins may each include a mating feature that prevents and/or decreases the chance of the insertion of the multiple fuse pins into the receiver 320 and does permit the insertion of each fuse pin into a receiver it is configured to be used with to connect together two or more components.

Figure 9:
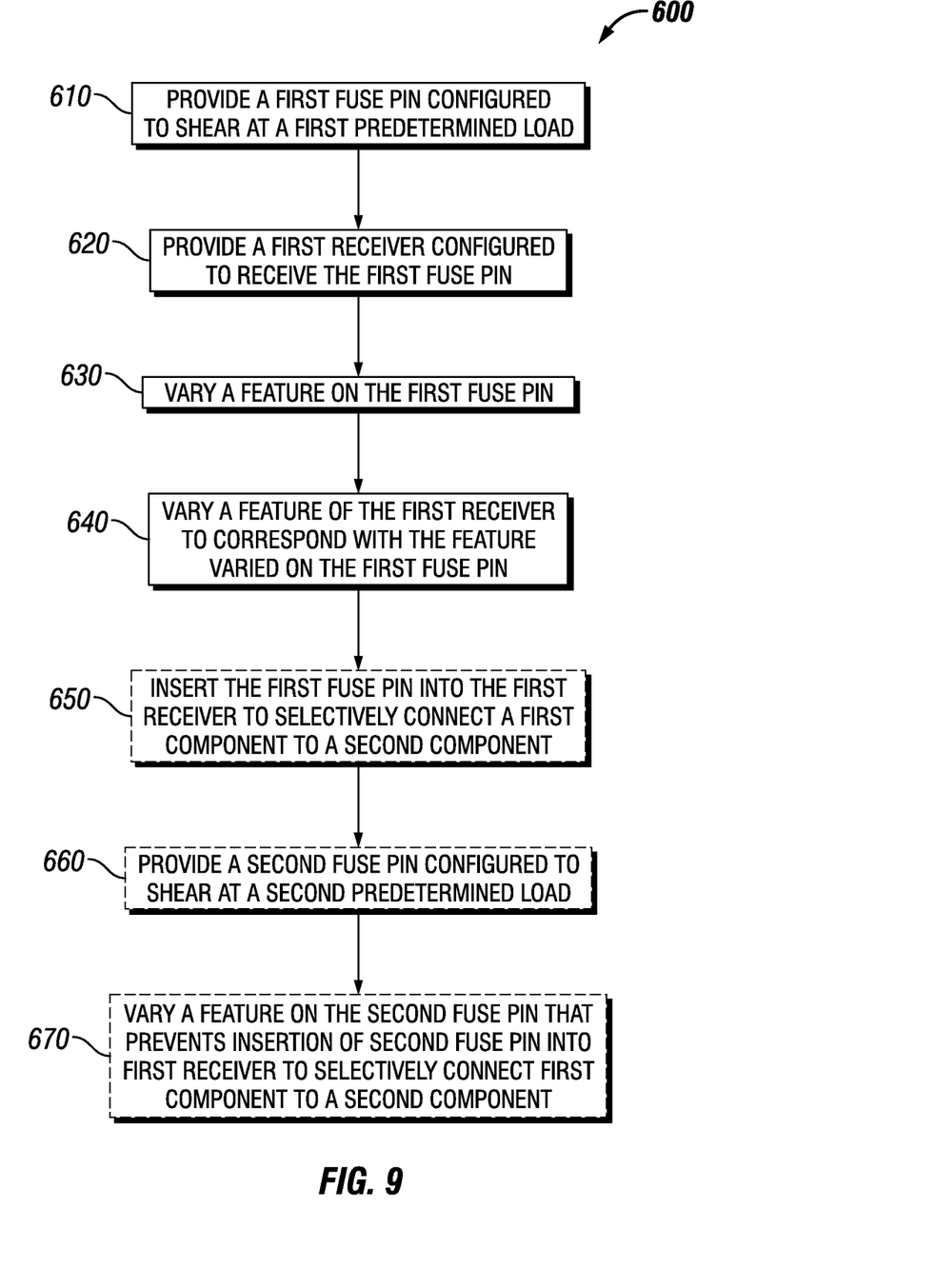
FIG. 9 is a flow chart showing one embodiment for a method of providing a fastening system having differentiable components.

FIG. 9 shows a flow chart showing one embodiment for a method 600 of providing a fastening system having differentiable components. A first fuse pin configured to shear at a first predetermined load is provided as step 610. As discussed above, the fuse pin may be configured to shear upon a set load to protect damage to other components upon the application of the predetermined load. A first receiver configured to receive the first fuse pin is provided at step 620. A feature on the first fuse pin is varied with respect to the same feature on a second fuse pin in step 630. In step 640, a feature of the first receiver is varied to correspond to the feature varied on the first fuse pin to permit the first fuse pin to be inserted into the first receiver. The varying of features in steps 630 and 640 may decrease the chance that a fuse pin not intended to be used with the first receiver may be inserted into the first receiver to connect together two or more components.

The method 600 may include step 650, inserting the first fuse pin into the first receiver to selectively connect a first component to a second component. The first and second components may be parts of an aircraft. The insertion of the first fuse pin into the first receiver may selectively connect more than two components together. The insertion of the first fuse pin into the first receiver may align a plurality of apertures of the first fuse pin with a plurality of apertures of the first receiver to permit the insertion of fasteners through the apertures to selectively connect the first fuse pin to the first receiver. The method 600 may include providing a second fuse pin configured to shear at a second predetermined load at step 660. The second predetermined load may differ from the first predetermined load. The method 600 may include varying a feature on the second fuse pin in step 670. Varying the feature in step 670 may prevent or decrease the chance of the insertion of the second fuse pin into the first receiver to selectively connect together a first component and a second component. Varying the feature in step 630 may include providing a tab and varying the feature in step 640 may include providing a groove, wherein the tab may fit within the groove when the first fuse pin is inserted in the receiver. Alternatively, the receiver may include a shaped protrusion and the first fuse pin may include a correspondingly shaped recess that mate together when the inserted together as would be appreciated by one of ordinary skill in the art having the benefit of this disclosure. Varying the feature in step 630 may include varying a slope of a portion of the first fuse pin and varying the feature in step 640 may include varying a slope of a portion of the first receiver to mate with the slope of the varied portion of the first fuse pin.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A fastening system having differentiable components, the system comprising:
   a first fuse pin configured to shear upon an application of a first predetermined load, the first fuse pin having a first mating feature, the first fuse pin having a projection having a first outer diameter, a first flange, an aperture in the first flange, a second flange, and an aperture in the second flange, the first and second flanges together having a second outer diameter larger than the first outer diameter; and
   a first receiver having an opening having a first inner diameter configured to receive the projection of the first fuse pin, the first receiver having a second mating feature, the first receiver having a third flange, an aperture in the third flange, a fourth flange, and an aperture in the fourth flange, the third and fourth flanges together having a third outer diameter and a second inner diameter, wherein the third outer diameter and second inner diameter are each larger than the first inner diameter;

wherein the second mating feature corresponds to the first mating feature to permit an insertion of the projection of the first fuse pin into the first receiver to selectively connect a first component to a second component, wherein the insertion of the projection of the first fuse pin into the opening of the first receiver aligns the apertures of the first fuse pin with the apertures of the first receiver.

2. The system of claim 1, wherein the first and second components are parts of an aircraft.

3. The system of claim 2, wherein the first component further comprises a dog house assembly and the second component further comprises a gear beam.

4. The system of claim 1, further comprising a plurality of fasteners inserted through the apertures of the first fuse pin and the apertures of the first receiver to selectively connect the first fuse pin to the first receiver.

5. The system of claim 4, wherein the plurality of fasteners are inserted transverse with respect to the projection of the first fuse pin.

6. The system of claim 1, further comprising a second fuse pin configured to shear upon an application of a second predetermined load, the second fuse pin having a third mating feature, wherein the third mating feature and the second mating feature prevents an insertion of the second fuse pin into the first receiver to selectively connect the first component to the second component.

7. The system of claim 6, wherein the second predetermined load differs from the first predetermined load.

8. The system of claim 6, wherein the first fuse pin is configured to selectively connect together components of a first aircraft and the second fuse pin is configured to selectively connect together components of a second aircraft, the second aircraft and the first aircraft not being identical.

9. The system of claim 6, wherein the first mating feature further comprises the shape of a head of the first fuse pin, a tab, a groove, a slot, a projection, a ridge, a valley, or the second outer diameter.

10. The system of claim 9, wherein the third mating feature further comprises the shape of a head of the second fuse pin, a tab, a groove, a slot, a projection, a ridge, a valley, or an outer diameter and wherein the third mating feature prevents the insertion of the second fuse pin into the first receiver to selectively connect the first component to the second component.

11. The system of claim 1, wherein the second mating feature is a mirror image of the first mating feature.

12. A method of providing a fastening system having differentiable components comprising:

providing a first fuse pin having a head and a projection extending from the head, the first fuse pin configured to shear upon an application of a first predetermined load;

providing a first receiver having a first flange, a second flange, and an opening, the opening configured to receive the projection of the first fuse pin and the first and second flanges configured to receive the head of the first fuse pin;

varying a feature on the head of the first fuse pin with respect to the same feature on a head of a second fuse pin;

varying a feature of the first receiver to correspond with the feature varied on the first fuse pin, wherein the first fuse pin may be inserted into the first receiver, wherein varying the feature on the head of the first fuse pin further comprises providing a tab and varying the feature of the first receiver further comprises providing a groove, wherein the tab of the first fuse pin fits within the groove of the first receiver when the first fuse pin is inserted into the first receiver; and inserting the projection of the first fuse pin into the opening in the first receiver to selectively connect together a first component and a second component, wherein the insertion of the projection of the first fuse pin into the opening of the first receiver aligns a plurality of apertures on the head of the first fuse pin with a plurality of apertures on the first and second flanges of the first receiver and further comprising inserting a plurality of fasteners through the plurality of apertures to selectively connect the first fuse pin to the first receiver.

13. The method of claim 12, further comprising providing;

providing the second fuse pin, the second fuse pin configured to shear upon an application of a second predetermined load, the second predetermined load differing from the first predetermined load; and varying a feature on the head of the second fuse pin, wherein the varied feature prevents an insertion of the second fuse pin into the first receiver to selectively connect together a first component and a second component.

14. The method of claim 12, wherein the plurality of fasteners are inserted transverse with respect to the projection of the first fuse pin.

15. A fastening system having differential components, the system comprising:

a first fuse pin having a head and a projection extending from the head, the first fuse pin having a first mating feature on the head;

a first receiver having a first flange, a second flange, and an opening configured to receive the projection of the first fuse pin, the first receiver having a second mating feature, wherein the first and second flange are configured to receive the head of the first fuse pin; and a second fuse pin having a head and a projection extending from the head, the second fuse pin having a third mating feature on the head;

wherein the second mating feature corresponds to the first mating feature to permit the insertion of the first fuse pin into the first receiver to selectively connect a first component to a second component;

wherein the third mating feature in combination with the second mating feature prevents the insertion of the second fuse pin into the first receiver to selectively connect the first component to the second component.

* * * * *